Jan. 23, 1945.  E. CHAPMAN  2,367,715
METHOD AND APPARATUS FOR METAL TREATMENT AND FABRICATION
Filed Dec. 18, 1943  3 Sheets-Sheet 2
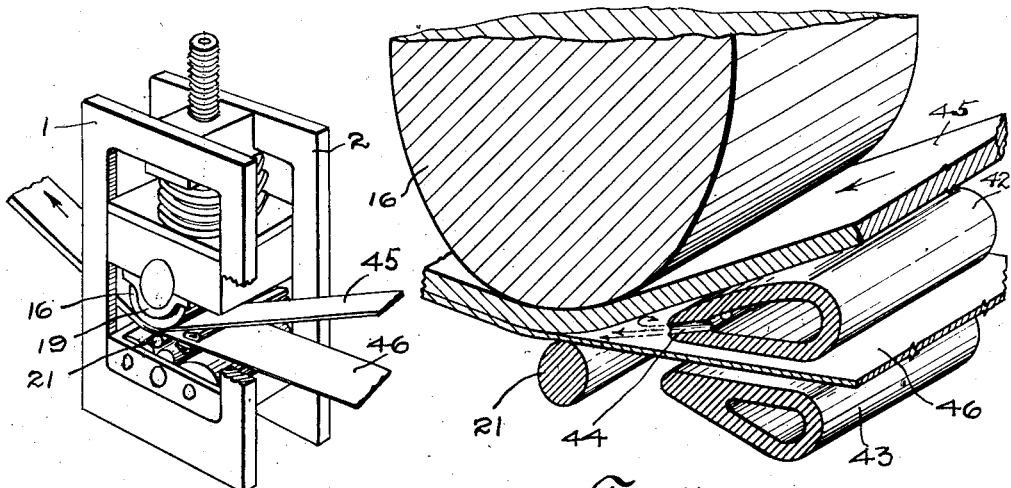
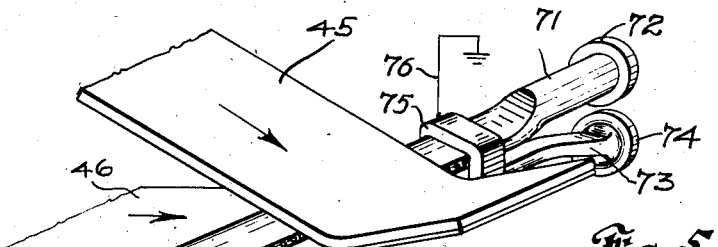
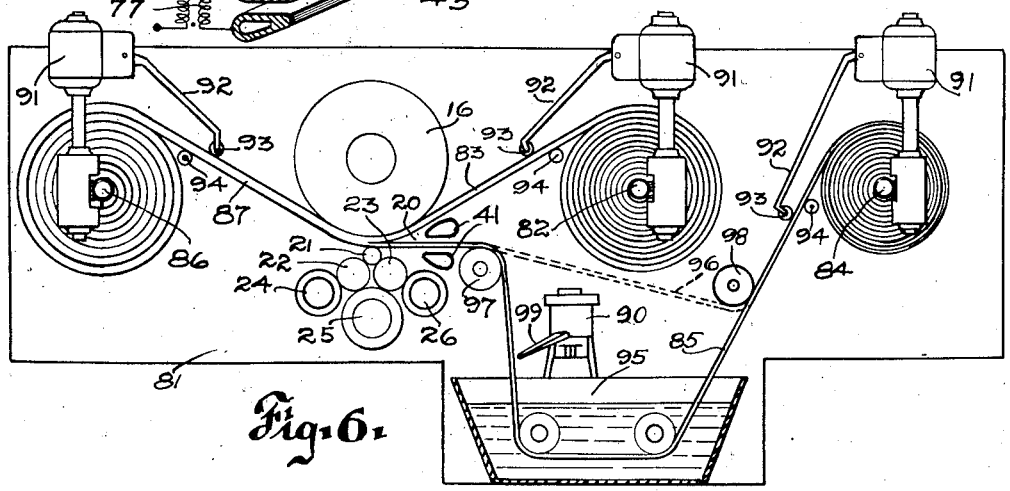
INVENTOR.
Everett Chapman,
BY Saywell & Wesseler,
ATTORNEYS.

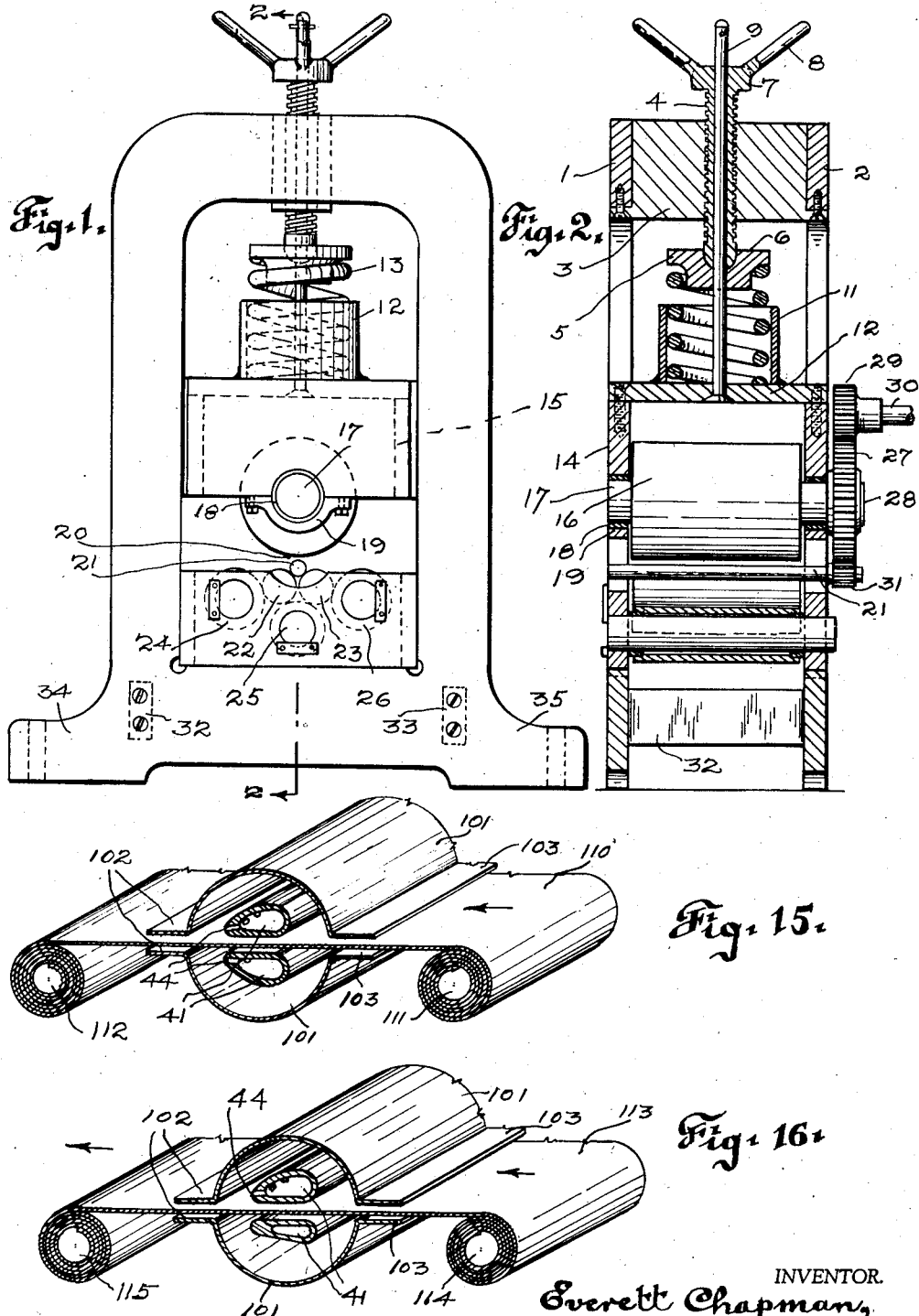

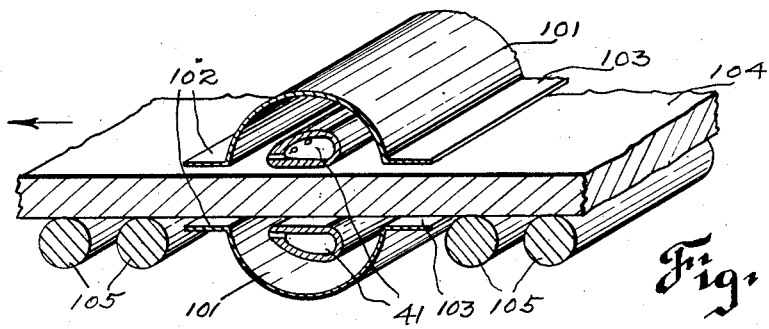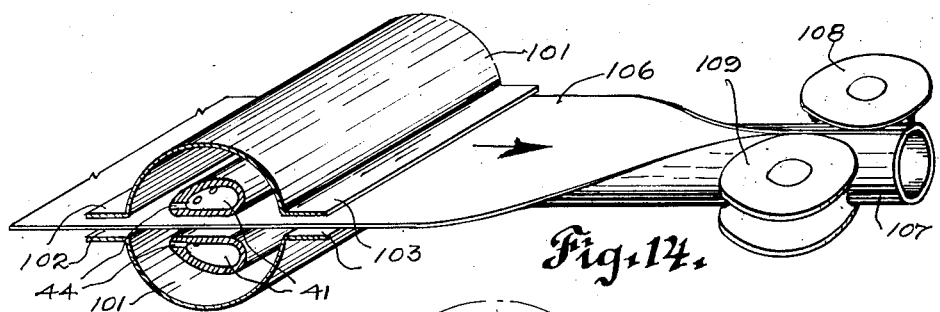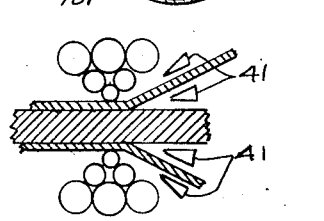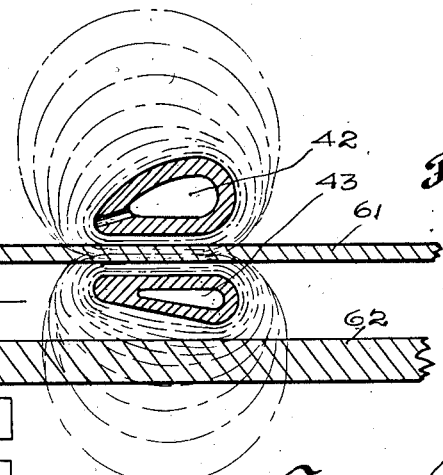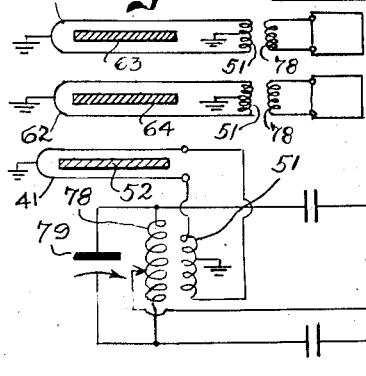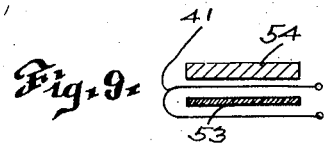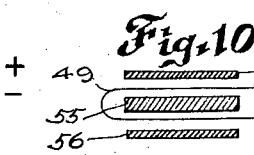

Patented Jan. 23, 1945

2,367,715

UNITED STATES PATENT OFFICE 2,367,715

METHOD AND APPARATUS FOR METAL TREATMENT AND FABRICATION

Everett Chapman, West Chester, Pa.

Application December 18, 1943, Serial No. 514,857

3 Claims. (Cl. 219—13)

This invention, as indicated, relates to a method and apparatus for metal treatment and fabrication. More particularly, it comprises localized heating of the surface of metallic material and chemical cleansing of the same. It also includes the progressive localized heating of metallic surfaces and the cleansing of the same coupled with the application progressively of pressure adequate to unite a plurality of metal strips or sections to bring about the bonding or cladding of one metal with another metal or uniting a plurality of strips or sections to each other. The preferred method of carrying out the invention includes the use of high frequency apparatus whereby the surface of the metal is heated to very slight depth over small areas progressively and while so heated is subjected to the action of a reducing gas thus combining surface heating and surface coating removal, including "bright surfacing." Thus, through the use of a high frequency "skin effect" on the metallic surface together with a reducing gas of high potency, bright surfacing may be carried out at extremely low cost and on a quantity production basis. The high frequency heating and gas cleansing process involves induced heating currents flowing at smaller and smaller distances from a metallic surface as the frequency of the source of power is raised. This may heat merely the surface for the critical instant necessary and only in the area of reducing gas impingement. The heat flow from the heated skin to the cold interior of the sheet by metallic conduction is at a high rate, and the mass of the metal heated is very small. This conduction serves to cool the cleaned surface below oxidizing temperatures before the cleaned material is removed from the protective atmosphere of the reducing gases. Any desired depth of penetration can be had by adjustment of the frequency to the composition of the metal under treatment. Where permeable or paramagnetic material is treated the heating is increased by hysteresis effects. In view of such a high rate of heat flow inwardly from the heated skin to the cold sink of the interior, it is necessary to use energy inputs of several times the rate of flow to the sink in order to attain the proper temperature as fast as possible of a duration only long enough for the gas to do its chemical cleansing, and to then take advantage of the rapid cooling of the surface by the interior to minimize the protective period following the operation.

The cladding operation may be carried out on one side or both sides of the metal section or strip under treatment. By feeding the strips over a large diameter roller at an angle the subsequent tendency of the sheet to warp will be minimized. The use of a gas as the cleansing medium is applicable to most metal, but where a thin layer of stainless steel is to be applied to a steel base or the like the method may include the pickling of the stainless steel preliminary to the surface heating and bonding of the metal sections or strips and may also include the application of a silver solder coating or a spray of any easily reducible metal to serve as a temporary protective coating and what may be termed a transition layer.

The process may be carried out by various types of apparatus, but in the preferred apparatus the heating of the skin or surface of the metallic sections or strips is brought about through the use of high frequency currents from any source, but preferably those of suitable high frequency generated by commercially available power tubes in an oscillating circuit, such for example as the Hartley circuit, herein illustrated. These high frequency devices are subject to very precise control. With a suitable source of high frequency power the output of such unit may be fed through suitable matching impedances to a single turn coil, which may heat an adjacent surface area, or engage around a strip, and the internal magnetic field of such coil may be used alone as the heat inducing means for surface cleansing as above stated. For cladding, simultaneous balanced heating of two strips by one coil may be carried out very compactly and efficiently, with one strip of material of low permeability, such as the non-magnetic cladding metal in the intense internal field area while the external magnetic field serves to heat the skin surfaces of the magnetic base metal by induced eddy currents and magnetic hysteresis. By adjusting the rate of energy input and the frequency of the oscillating circuits the depth of the heating penetration can be very precisely controlled.

The amount of the power used and the manner of its application may be varied in accordance with the specific materials to be treated or fabricated. The use of two magnetic fields in the manner stated above has been demonstrated on two strips of metal wherein three kilowatts of power served to heat a strip of copper of .010 of an inch thickness, and a strip of steel of $\frac{1}{16}$ of an inch thickness, each four inches wide, to a temperature of 1600° F., in twenty seconds simultaneously. The heat was confined to the region immediately adjacent the inductors.

The thinness of this current layer and the confinement of the heated region, the very "sharpness" of the phenomena, increase with the frequency of the applied power. In the case of surface cleansing the internal field of the inductor loop serves to heat both surfaces of the piece of material threading through the loop as a single simultaneous operation, and the depth of penetration of the heat can be confined to a thin skin on each surface by suitable adjustment of the frequency and rate of energy input. It has been found advantageous to use high frequencies ranging between 200,000 cycles and 1,000,000 cycles for thin skin heat penetration, but it must be kept in view that the voltage drop over the single turn coil must not reach unmanageable values. The particular material under treatment and the conditions associated with the operation may require variations in the character of the power used and the method of its application.

It has been found most advantageous when uniting non-ferrous metal strips or sections to each other, or uniting non-ferrous metal to ferrous or permeable base metal, to position an individual high frequency loop around each non-ferrous strip so that it receives the intense heating effect of the internal field of the loop which as stated is greater than the external field. However where such non-ferrous metal strips are to be bonded to adjacently positioned ferrous strip material, balanced heating of the strips is brought about by placing the high frequency loop very close to the ferrous material so that it may receive the heating effects due both to eddy currents and to hysteresis. When so arranged the surfaces to be bonded are adequately conditioned to permit perfect union of the strips within the bonding throat of the apparatus.

The particular use of the bimetal or multiple strip material of many layers determines whether the cladding metal shall be thick or thin relatively to the metal used as a base. While it is general practice to clad inexpensive ferrous metal with metals of greater cost, there are specialized uses which require thin ferous metal cladding strips over more expensive metal used within the same.

The invention includes the surface cleansing of tubing whether such tubing is in finished lengths or in the process of manufacture from skelp, and may be carried out on the internal and external surfaces of such tubing. As has been indicated, it may also be applied to the surface cleansing of huge slabs of metal, such as steel plates, shapes, blocks or the like as an intermediate step, in their fabrication.

The principal object of the present invention is to improve the method and apparatus of metal treating and fabrication wherein surface cleansing as an intermediate step is carried out.

Another object of the invention is to provide an apparatus for the surface cleansing of metal sections, shapes or strips as a preliminary step in metal fabrication.

Another object of the invention is to provide a method and apparatus for metal cladding on one or both sides of a metallic base which is adapted for quantity production of high quality at low cost.

Another object of the invention is to provide an apparatus having a large pressure roll and a pressure roll of small diameter to provide high lineal pressure across a narrow line of contact with means adjacent thereto for heating and simultaneously cleansing the material under treatment, preliminary to the uniting of such metallic material between the pressure rolls.

Another object of the invention is to provide an apparatus for "bright surfacing" metal articles at high speed with a minimum cost of heating and cleansing the surface areas thereof.

Another object of the invention is to provide an apparatus for uniting metal sections or strips at a relatively high rate of speed and with a bond of quality permitting subsequent fabrication without deterioration or destruction.

Other and further objects of the invention will appear in the course of the following description.

To the accomplishment of the foregoing and related ends, said invention, then, consists of the means and methods hereinafter fully described and particularly pointed out in the claims, the annexed drawings and the following description setting forth in detail certain mechanism and methods embodying the invention, such disclosed means and methods constituting, however, but several of various forms in which the principle of the invention may be used.

In said annexed drawings:

Fig. 1 is a side elevation of a cladding mill or cladding press embodying the principles of the invention;

Fig. 2 is a central vertical sectional view of the structure shown in Figure 1 as seen along the line 2—2 looking in the direction of the arrows;

Fig. 3 is a perspective on a reduced scale and partly broken away showing a cladding mill of the type illustrated in Figures 1 and 2 operating upon a strip of base metal and a strip of cladding metal;

Fig. 4 is a fragmentary perspective view on a greatly enlarged scale showing the action of the heating, cleansing, and pressing elements of the apparatus shown in Figures 1, 2 and 3;

Fig. 5 is a fragmentary perspective view showing the single loop heating coil in relation to the strips of cladding metal and base metal, and the source of current;

Fig. 6 is a diagrammatic view showing the relation of a chemical bath for removing surface coatings from stainless steel when used in conjunction with the cladding mill;

Fig. 7 is an enlarged sectional diagrammatic view illustrating the relationship of the single loop coil to a base metal and cladding strip to provide surface heating effects;

Fig. 8 is a wiring diagram showing an oscillator circuit in relation to a single turn coil for producing surface heating effects on metallic sections or strips;

Fig. 9 is a diagrammatic view showing the position of the coil with reference to the base metal strip and cladding strip when a single strip of cladding metal is to be applied;

Fig. 10 is a view similar to Figure 9 showing the arrangement of the coil when two ferrous strips are to be applied to the surfaces of a non-ferrous base strip;

Fig. 11 is a diagrammatic side view showing the cladding of two non-ferrous metal strips upon a ferrous base strip;

Fig. 12 is a diagrammatic transverse view of the structure illustrated in Figure 11, as relates to the high frequency loops, and also includes their source of power;

Fig. 13 is a fragmentary perspective view partly in section illustrating diagrammatically the relationship of the single turn loop and gas supplying unit for surface cleansing of a slab of metal;

Fig. 14 is a view similar to Figure 13 showing the application of a single turn loop and gas supplying unit to a strip of skelp preliminary to its being formed into a tube and for removing the surface coatings from the inner and outer walls thereof;

Fig. 15 is a diagrammatic view in perspective illustrating the application of a single turn coil and gas supplying unit positioned to "bright surface" the top and bottom surfaces of a rolled metal strip passed within said loop; and Fig. 16 is a view similar to Figure 15 showing the apparatus adapted for surface cleansing the top surface only of a strip of rolled material passed between the same.

As has been indicated, the invention may take various forms and be applied to different uses. When used for cladding it is desirable to have a heavy duty press for uniting the metal strips to be bonded and permitting enough space adjacent the bonding throat for the heating action of the single turn coil and gas supplying means to remove oxide coatings. One form of press is illustrated in Figures 1 and 2, and Figure 3 shows such press or mill with the base metal and cladding strips in position beneath the rollers. The manner in which the several strips to be bonded are supplied to and taken from the rollers is illustrated in Figure 6.

As is clearly shown in Figures 1 and 2 the press is formed of a pair of side frames 1, 2, having a central head abutment 3 fitted with a screw bar 4 bearing against a spring abutment 5 at its lower end in a ball and socket joint 6. The upper end of the screw bar is provided with an integral head 7 with lever arms 8 through which pressure may be applied to the spring abutment. The screw bar 4 and spring abutment 5 are preferably centrally apertured to receive a guide bar 9 secured at its lower end centrally of the frame of the roller housing 11 which carries on its upper side a spring housing 12 within which a coil compression spring 13 is received, the lower end of the spring resting on the top face of the roller housing. A hydraulic press may be used where required.

The roller housing is provided with side plates 14 and end plates 15. A roller 16 of relatively large diameter is rotatably supported within said housing having bearing elements 17 on each side supplied with suitable bushings 18 held by means of detachable bearing plates 19. In order to provide for high pressure and a line contact as well as ample space around the bonding throat 20 a roller 21 of small diameter is provided, said roller being backed up by two idler rolls 22, 23, bearing against supporting rolls 24, 25, 26. A large gear 27 is secured to the extension shaft 28 of the roller 16 and is driven by a pinion 29 on the drive shaft 30. The small roller 21 is preferably driven by a small gear 31 in engagement with the large gear 27, for uniform movement therewith. The frame of the cladding mill may be provided with bracing bars 32, 33, across the ends thereof, and the side frames may be provided with foot extensions 34, 35, for securing the same to a suitable foundation or support.

In addition to suitable bonding pressure a perfect bonding operation requires perfect cleanliness of the surfaces to be bonded and adequate heat in conjunction with pressure to effect a union of the metal sections or strips under treatment. In order to provide adequate heat use is made of the heating effects of a high frequency electrical current, a single turn loop 41 having an upper section 42 and lower section 43 and being positioned adjacent the bonding throat heretofore described. In order to provide cleanliness for the metals to be bonded at least one portion of the loop is made hollow to serve as a conveyor of a reducing gas, such gas being discharged through suitable apertures 44, into the space intermediate the surfaces to be bonded. A reducing gas under a suitable degree of pressure, and preferably one acting quickly and with an adequate safety factor against explosive reactions has been found to be available. Such gas under suitable pressure prevents any oxidizing gases having access to the newly heated and cleansed surfaces, and after the action of the pressure rolls there is substantially immediate cooling of the metals along the bonding zone.

In order to compensate for differences in metal thickness and tendency to warp or show effects of internal stresses after the bonding operation, it is entirely practical to stretch the metal strips during the bonding operation in the manner shown in Figures 3, 4 and 5.

Through the use of a large roller 16 above the heavier strip of metal under treatment 45 and a smaller roll 21 beneath the lighter strip of metal 46 the pressure thus applied will produce a sheet of bonded metal substantially free of warp or internal stresses. The source of high frequency current is preferably in the ranges of high frequency above those supplied by a generator and accordingly use is made of an electronic tube as a source of oscillations which may be used at very high degrees of frequency coupled with a high rate of movement of the strips being bonded past the bonding throat and beneath the pressure rolls. Various types of oscillator circuits may be used, the circuit shown in Figure 8 of the drawings being the Hartley circuit to which has been added a single turn loop coupled with the transformer by a matching impedance 51. The single turn coil 41 is shown in Figure 8 as having threaded within the same a strip of metal 52 which is to receive a surface heating of a slight depth and simultaneous treatment with a rapidly acting reducing gas. In Figure 9 the loop 41 is positioned around the thinner sheet of cladding metal 53, the base metal strip 54 being of ferrous metal and subject to the heating effect of eddy currents and hysteresis thus compensating in a measure for the greater amount of heat applied to the more conductive strip of cladding metal within the loop. In Figure 10 the loop 49 is shown as engaged around the non-ferrous strip 55 with a thinner sheet of cladding metal 56 on the under side and a similar sheet of cladding metal 57 on the upper side of such strip 55. The equalizing of the heating effects must be attained by suitably spacing the elements of the loop closer to the ferrous metal strips than to the non-ferrous strip. The manner in which the heating effects are produced is illustrated in Figure 7 wherein a cladding strip 61 moves centrally between the upper and lower members of the loop 42, 43, respectively, being subjected to the heating action of the eddy currents intermediate the loop members. The base metal strip 62 being of ferrous material and permeable to the magnetic forces is subject to both eddy current effect and hysteresis. In this manner satisfactory heating of both the base metal strip and the cladding strip will be brought about. In Figures 11 and 12 two single turn coils 61, 62, are engaged around upper and lower non-ferrous strips 63, 64. These may be bonded directly to each other, or, as shown to an intermediate ferrous metal strip 55. Multiple coils may be used in place of single turn coils wherever conditions require.

The single turn loop or high frequency coil 41 may assume various forms but as shown in Figure 5, comprises a hollow upper member 42 of somewhat lenticular cross-section with a series of apertures 44 in its narrow edge to permit a reducing gas to flow through the hollow interior and be ejected under pressure within the V-shaped area between the base metal strip 45 and the strip of cladding metal 46. The flattened body portion of the member 42 is merged into a cylindrical portion 71 preferably having a flange 72 for attachment of the supply conduit of the reducing gas, through which preheated reducing gas of high potency may be forced under suitable pressure against the heated metal surfaces under treatment. The lower member of the loop structure may be of identical shape and carry reducing gases when used for bright surfacing action on adjacent surfaces of a block, shape, strip or the like. When used for bonding or cladding the cleansing action of the reducing gas is applied primarily to the surfaces of the adjacent metal strips which are to be integrally united beneath the pressure rolls. For some cladding operations the lower member 43 of the loop may be hollow to receive cooling water or other suitable cooling fluid and its narrow edge is without perforations and is preferably a heavy solid metal area adapted to serve as an efficient electrical conductor for the high frequency current. The lower member also merges into a somewhat cylindrical enlarged end portion 73 having a flange 74. A heavy collar or band 75 of conductive material is integrally secured to the upper and lower members 42, 43, adjacent their enlarged end portions to provide a current path around the single turn loop. This collar is provided with a ground connection 76 to the frame. The free ends of the members 42, 43, are sealed with end walls and adjacent thereto are connected to each other by the conductor 77 having the matching impedance 51 of the transformer unit 78 shown in Figure 8. The variable condenser 79 provides for control of the frequency.

The depth of penetration of the surface heating may be thus controlled with precision and the speed of movement of the strips or sections of metal to be bright surfaced, or bonded, as the case may be, can be increased to a high production rate with perfectly balanced heating, cleansing, and bonding operations taking place practically simultaneously.

When stainless steel is to be bonded a final removal of accumulations of surface coatings on the bonding surface of the stainless steel strip may require the use of an auxiliary chemical treatment as is shown diagrammatically in Figure 6. In such view, a suitable frame 81 supports the base metal reel 82 carrying the base metal strip 83, and the reel 84 for the stainless steel strip 85. It also supports the cladding press elements, and on the side thereof opposite to the supply reels 82, 84, supports the bi-metal receiving reel 86, carrying the bonded strip 87. In order to provide adequate operating tension on the metal strip or strips under treatment, each reel is provided with a take-up motor 91 brought into action by means of a switch arm 92 with a roller 93 contacting the adjacent strip of metal at a point beyond an idler roller 94. When any switch arm is dropped through lack of tension on the strip its roller 93 will fall causing the switch arm 92 to actuate suitable connections to energize its motor and restore the predetermined amount of tension on the strip. The stainless steel chemical treatment tank 95 may involve more than a single bath, but as stated is supplied as a conditioning unit used where perfect bonding is an absolute requirement. The tank 95 is used only in cladding stainless steel, and the path 96, shown in dotted lines in Figure 6 between the idler rollers 97 and 98, is used for cladding metal of other composition.

The tank may support a heated reservoir 90 provided with a spray outlet 99 whereby a newly treated sheet of stainless steel may be supplied with a temporary protective coating of easily reducible metal immediately after the sheet emerges from the pickling bath.

When mere bright surfacing on a roll of sheet metal is to be carried out the press shown in Figure 6 may be used under light frictional contact as a strip feeding unit for a supply of metal to be bright surfaced carried on the reel 84 and is received on the reel 86, after passing over the idler rollers 98 and 97 and centrally of the loop 41 and through the bonding throat. The speed and the frequency used, the rate of energy input, and the gas pressure for the reducing gases must be adjusted for the character of the work under treatment. Instead of using the press as the means of moving the strip the receiving reel 86 may be used, means for controlling the speed of the take-up motor being supplied.

During the cladding operation access of air to the heated and cleansed inner surfaces of the adjacent strips is excluded by the volume of reducing gases discharged under pressure into the narrow space adjacent the bonding throat, and after the metals have been pressed into integral union such surfaces are protected against oxidation even if the residual temperatures should remain at a high point momentarily within the bonding zone. A hood or ventilating passageway may be provided to carry off residual gases after they emerge at the sides of the triangular heating space between the strips.

The above described exclusion of air does not take place when the apparatus is used exclusively for bright surfacing, since only a single strip, shape, section, or the like, of metal is treated and no substantially closed space of somewhat triangular cross-section is provided for the partial enclosure of the reducing gases. It is necessary therefore to provide a restricted chamber or area within which the reducing gases under more than atmospheric pressure may have exclusive contact with the metal surface or surfaces to be cleansed. This restricted area may be provided in various ways, but as illustrated in Figures 13, 14, 15, and 16, a shield or gas confining hood, 101, with open ends is provided on each side of the loop, and it serves also as a protection for the loop or coil 41, irrespective of whether the upper or lower members 42, 43, carry gas or cooling fluids. The shield or hood 101, preferably has an arched central portion and has forward and rearward side flanges 102, 103, which are supported in closely spaced relation to the metal under treatment.

As is shown in Figure 13 a slab or block 104 of ferrous metal is supported on rollers 105 one or more of which may have means to turn the same to cause the block to travel through the bright surfacing zone centrally of the loop 41 and intermediate the upper and lower hoods 101. The ends of the hoods may be partially closed if low pressure is used on the reducing gas supply emerging from the jets in the edges of the hollow upper and lower loop members. In any event some of the reducing gas escapes between the forward flanges 102 and the metal block and serves the purpose of a cooling leer on the side toward which the block is moving. It also serves as a pressure, sealing means beneath the rearward flanges 103, to prevent oxidizing gases entering the hood at such point. The jet apertures 44 for discharging the reducing gases are turned in the direction of travel of the block and serve to bright surface the upper and lower surfaces and adjacent side edges of the block. The jets may be also directed downwardly or at any selected angle.

In Figure 14, skelp 106 is bright surfaced on both sides, preliminary to being formed into a tube 107 between forming rolls 108, 109. The jet apertures 44 are shown as turned reversely to the direction of travel of the skelp, but may if desired be turned in the direction of travel if the speed of operation and area of gas action conform to such requirement. The other elements of the structure are similar to those described in connection with the disclosure in Figure 13.

In Figure 15 metal strip material 110 on the reel 111 is carried through the center of the single turn coil 41 and is bright surfaced on both sides simultaneously and wound on the receiving reel 112. The hoods 101, single turn coil 41, and jet apertures 44 for the reducing gases are similar to those above described as shown in Figure 13.

In Figure 16, the metal strip material 113 is bright surfaced on only one side, being carried from the reel 114 through the center of the single turn coil 41 and wound on the receiving reel 115. Only the upper member of the single turn coil carries reducing gas and has jet apertures 44, the lower member being supplied with cooling fluid and having no discharge apertures.

It is to be understood that a relatively movable hollow high frequency loop carrying reducing gases or having an adjacent reducing gas supply, may be passed through the interior of a length of seamless tubing to bright surface the same as a final step or preliminary to cladding or other fabrication. The exterior surfaces of tubes, together with rods and bars may be bright surfaced in a manner similar to the cleansing of strips, shapes, and blocks as above described. It is also to be understood that the metal after cleansing, and as a continuous operation while still heated, may be exposed to conditioning vapors, or liquids, or atmospheres to bring about certain predetermined physical effects.

It is pointed out that the concentration into as small a space as possible of the two steps of heating and cleansing in the case of "bright surfacing" and the three steps of heating, cleansing and bonding in the case of metal cladding is of much importance both as to the results obtained and the economy of production on a quantity basis. In other words, substantially simultaneous operation in what may be termed an instant of time at a maximum temperature at the pressure line with chemically clean metal will require less heat and pressure and cleansing gas than where a greater interval elapses and the bonding occurs at a slightly lower temperature. Where extremely low bonding pressure is adequate the high frequency loop may include one or more of the pressure rollers with suitable insulation thereover to withstand the heat and pressure. The discharge of cleansing gases in such case would be carried into the triangular space between the metal surfaces to be joined by either the companion passageway forming a loop with the roller or by a separate conduit carrying the reducing gas, which, if required, could be suitably heated electrically or otherwise, as might be most effective.

Other modes of applying the principle of my invention may be employed instead of those explained, change being made as regards the mechanism and method herein disclosed, provided the means stated by any of the following claims or the equivalent of such means be employed.

I therefore particularly point out and distinctly claim as my invention:

1. A method of metal cladding which includes the steps of heating, cleansing, and bonding as a continuous operation, at least two thin strips of metallic sheet material of non-permeable and permeable character, respectively, at a meeting zone adjacent an induction loop of a high frequency, by passing the non-permeable strip centrally through the internal magnetic field of said induction loop, and subject to more intense eddy current effects, and passing the permeable strip through the external magnetic field of said loop, and subject to eddy current and hysteresis effects, whereby balanced heating of said strips is produced on adjacent surfaces, impinging preheated reducing gases of high potency on said heated surfaces and simultaneously moving said heated and cleansed strips into contact immediately adjacent said loop at said meeting zone, and applying pressure along said line of contact to produce an integral bonding of said strips.

2. A continuous high speed metal cladding apparatus having in combination a source of high frequency power with an input of energy several times in excess of the rate of metallic heat conduction to the cold sink or the body of metal under treatment, a single turn induction loop for providing a transverse magnetic field for shallow depth high frequency heating, means for feeding a cladding metal strip centrally of said loop and a ferrous base metal strip in close proximity externally to said loop at a rate of speed functionally related to the frequency and energy input, the electrical coupling between said cladding strip and base metal being adequate to produce predetermined heating effects, means for bringing said cladding strip and base metal strip into surface-to-surface contact for applying bonding pressure thereto closely adjacent said loop, and means closely associated with said loop and said pressure applying means for impinging reducing gases of high potency progressively on the inner adjacent surfaces of said cladding and base metal strips at the zone of contact, whereby said heated and cleansed areas of said strips are integrally united to each other.

3. A compact high speed metal cladding apparatus having in combination a source of high frequency power with an input of energy several times in excess of the rate of metallic heat conduction to the cold sink of the body of the metal under treatment, a single turn induction loop for providing a transverse magnetic field for shallow depth high frequency heating, means for supplemental final cleansing of a strip of stainless steel in advance of the position of said loop, means for feeding said conditioned stainless steel cladding strip centrally of said loop and a ferrous base metal strip in close proximity externally to said loop at a rate of speed functionally related to the frequency and energy input, means for bringing said cladding strip and base metal strip into surface-to-surface contact for applying bonding pressure closely adjacent said loop, and means closely associated with said loop and pressure applying means for impinging reducing gases of high potency progressively on the inner adjacent surface of said cladding and base metal strips, whereby said heated and cleansed areas of said strips are integrally united to each other.

EVERETT CHAPMAN.